United States Patent [19]
Lammon

[11] Patent Number: 5,454,130
[45] Date of Patent: Oct. 3, 1995

[54] RATCHETING FLANGE SCRAPER

[76] Inventor: David A. Lammon, 3873 Diablo St., Napa, Calif. 94558

[21] Appl. No.: 300,809

[22] Filed: Sep. 6, 1994

[51] Int. Cl.⁶ .................................................. B08B 9/02
[52] U.S. Cl. .................... 15/93.1; 15/104.02; 15/104.04; 15/236.01; 15/236.06; 15/236.1; 29/81.05; 29/DIG. 98; 285/15
[58] Field of Search ............................ 15/104.02, 104.03, 15/104.04, 236.01, 236.06, 236.09, 236.1, 93.1; 285/15; 29/81.05, 81.11, DIG. 98; 118/DIG. 11, DIG. 13

[56] References Cited

U.S. PATENT DOCUMENTS

| 550,099 | 11/1895 | Detrick | 15/104.02 |
|---|---|---|---|
| 790,371 | 5/1905 | Labadie | 15/104.02 |
| 1,387,027 | 8/1921 | Watrous . | |
| 2,480,739 | 8/1949 | Johnson . | |
| 2,706,304 | 4/1955 | Demory . | |
| 2,738,966 | 3/1956 | Davis . | |
| 3,091,791 | 6/1963 | Czapar, Jr. . | |
| 3,216,041 | 11/1965 | Walters . | |
| 3,613,147 | 10/1971 | Norfleet . | |
| 4,255,828 | 3/1981 | Colla . | |
| 4,531,253 | 7/1985 | Cottam . | |
| 5,235,719 | 8/1993 | Wimberley . | |

FOREIGN PATENT DOCUMENTS

| 402085465 | 3/1990 | Japan . |
|---|---|---|
| 222007 | 8/1968 | Sweden . |

Primary Examiner—Edward L. Roberts, Jr.
Attorney, Agent, or Firm—Richard C. Litman

[57] ABSTRACT

A flange-cleaning tool unites an actuating disk and integral handle with two cleaning disks in a primary embodiment. Union is achieved with a hub and bushing, both fitted through central circular apertures in the disks. The outward-facing sides of the cleaning disks are lined radially with cleaning elements, which may be, for instance, of the razor, rasp, or sandpaper type. Interspersed with the cleaning elements are debris apertures. The tool is manually or motor-powered, and incorporates a circumferential ratcheting mechanism in the primary embodiment. In a secondary embodiment, the ratcheting mechanism is located radially. Auxiliary devices may be attached for extra leverage, and a reinforcing lip on the handle makes it possible to safely apply a high impact force in difficult cleaning situations.

14 Claims, 3 Drawing Sheets

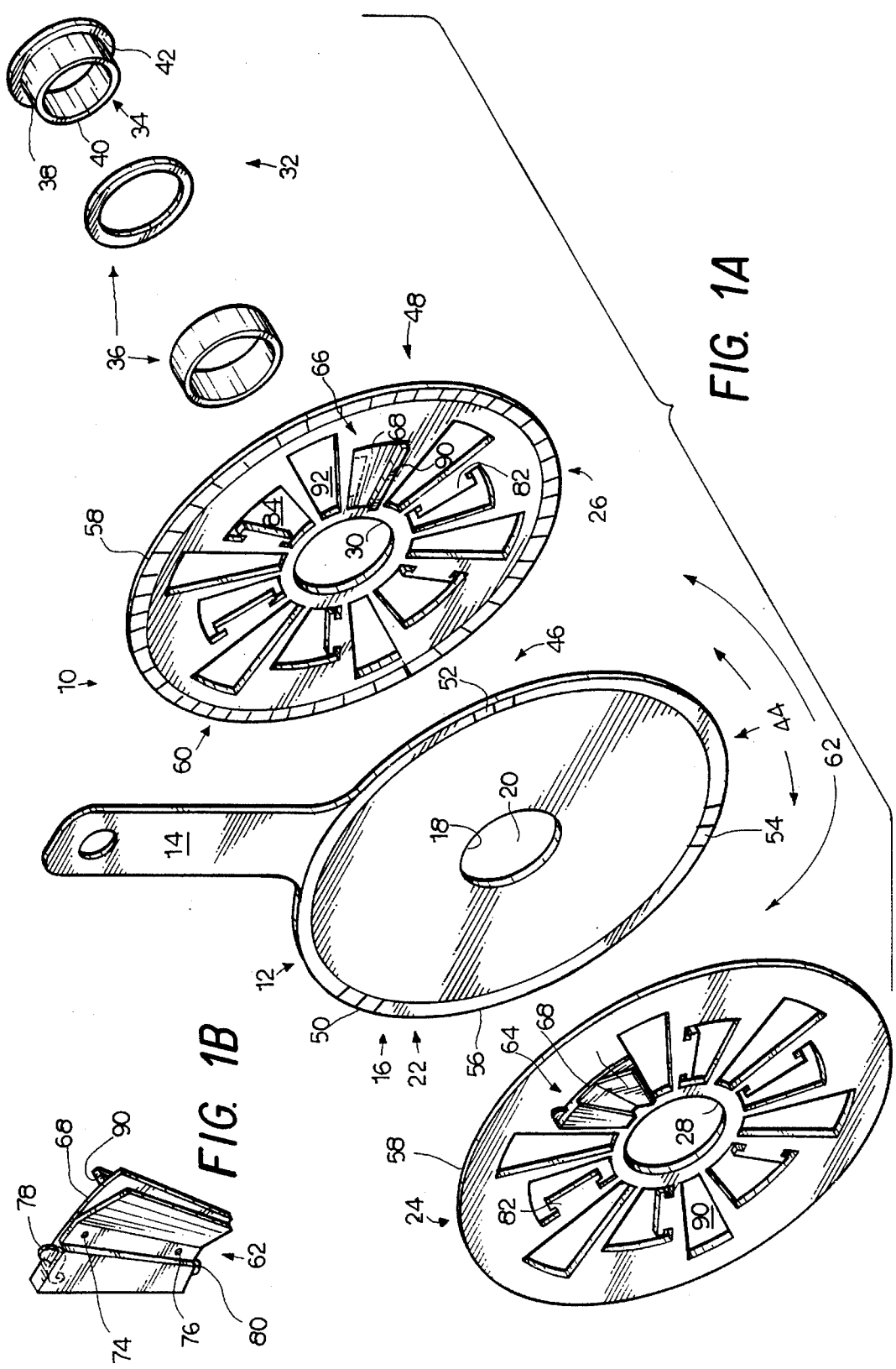

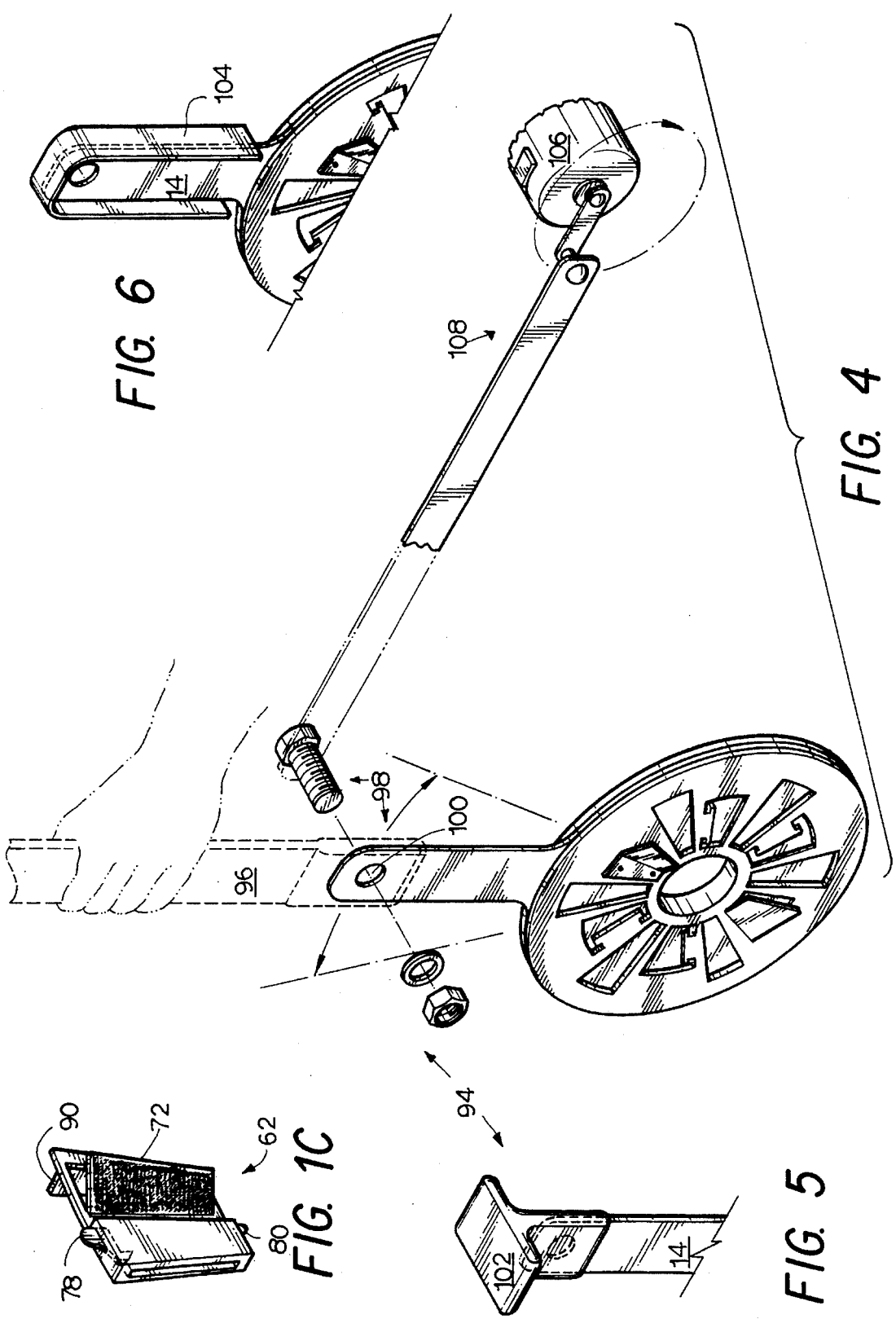

RATCHETING FLANGE SCRAPER

BACKGROUND OF THE INVENTION

1. Field of the Invention

The present invention relates to a device for cleaning gaskets, glues or the like from between piping system flanges, in situations wherein it is desirable or possible to separate the flanges by only a very small width.

2. Description of the Prior Art

A common problem in piping systems is the necessity of cleaning an old gasket and accompanying adhesive from between two flanges. Thorough cleaning in such a situation is essential, as any waste left in place may interfere with the proper attachment of a replacement gasket. An incomplete cleaning can result in a reassembled joint that leaks in service, and therefore costly losses will occur, especially if part or all of a system has to be shut down to correct the leak.

The traditional method for detaching old gaskets and the like in situ, wherein it is generally desirable, and sometimes required, to separate two flanges by only a very small gap, is time-consuming and often the results are unsatisfactory. For instance, wedges are driven between the flanges to spread them apart, and a hacksaw or similar thin blade is inserted into the gap to scrape away at the matter needing to be removed. The unsystematic nature of the process increases the chance that a spot of waste will go unnoticed—until the piping involved is put back into service. Furthermore, the cramped quarters in which this task must often be accomplished add to the burden of the process and increase the likelihood of an imperfect cleaning.

To remedy this problem, it is desirable and not previously known to have a specialized tool that can efficiently clean gasket material and the like from flange surfaces in an awkward environment.

Numerous patents have issued for cleaning tools of various types. In particular, there are a number for cleaning tools that use a rotating motion to scrape or otherwise clean a surface. For example, U.S. Pat. No. 2,706,304, issued to Harry Demory on Apr. 19, 1955, discloses a rotary-type scraper for use in cleaning meat blocks. Japanese patent No. 404,085,465, issued to Kunibagumi K. K. on Mar. 26, 1990, concerns a device for scraping and collecting asbestos and incorporates rotating cleaning parts. A linoleum cutter with cutting bars radially arrayed on a rotating disk is discussed in U.S. Pat. No. 2,738,966, issued to Lyle Davis on Mar. 20, 1956. U.S. Pat. No. 4,531,253, issued to Spencer D. Cottam on Jul. 30, 1985, teaches the use of a rotating disk bearing a plurality of bent wires for cleaning surfaces. U.S. Pat. No. 1,387,027, issued to Isaac A. Latrous on Aug. 9, 1921, shows a rotary scraper with spring arms.

Rotating scrapers that further include removable blades are also generally known. Examples of such devices are shown in U.S. Pat. No. 2,48,739, issued to Franklin D. Johnson on Aug. 3, 1949; U.S. Pat. No. 3,216,41, issued to Horace R. Walters on Nov. 9, 1965; and U.S. Pat. No. 3,613,147, issued to Oct. 19, 1971.

Some existing scraper tools possess a ratcheting ability. U.S. Pat. No. 4,255,828, issued to Dan P. Colla on Mar. 17, 1981, and U.S. Pat. No. 5,235,719, issued to Leon Wimberley on Aug. 17, 1993, disclose such tools.

Other clearing or cleaning tools are described in U.S. Pat. No. 3,091,791, issued to Frank Czapar, Jr. on Jun. 4, 1963, and Swedish Patent No. 222,007, issued on Aug. 6, 1968.

None of the above inventions and patents, taken either singly or in combination, is seen to describe the instant invention as claimed.

SUMMARY OF THE INVENTION

The present invention concerns an improved tool for cleaning facing flange surfaces in cramped quarters. The tool includes two cleaning disks which attach to an actuating element that includes an actuating disk and handle. The cleaning disks are retained against the actuating disk by a hub and bushing arrangement that extends through central circular apertures in the disks. The hub may permanently retain the components, or the mounting may be temporary in nature. Cleaning elements are arranged radially on the cleaning disks, interspersed with hollow debris ports for receiving debris.

The cleaning elements may be integral to the cleaning disks, or may be detachably attachable. A variety of cleaning elements are available, among them file, razor, and rasp blades.

In an alternative embodiment, the tool may comprise a unitary configuration, there being a blade portion having surface cleaning structure on one or both faces, and a handle. The handle is coextensive with the blade, so that neither the blade nor the handle has a projecting edge, relative to the other, which could interfere with a flange as the tool is inserted between flanges. A hole is formed in the blade portion, so that a bolt or similar fastener holding the flanges abutted is reinstalled, passing through the hole, and serves as a pivot enabling the tool to be moved through an arc, cleaning one or both flanges with each pass. A wedge configured as a sleeve fitting closely but slidably over the handle can be forced toward the axis of the pipe being serviced, to assist in separating the two flanges.

In use, a pair of flanges to be cleaned are separated such that the tool, which is very thin, can be inserted between them in a concentric configuration. The flanges are retightened so that the cleaning elements, on the outer surfaces of the tool, are against the flanges. In refastening the flanges, a sufficient number of the fasteners—which may be, for instance, bolts—are left out so that there is ample arc room for the tool to be used most efficiently. A suggested arrangement is to leave a 120 degree portion free.

In the primary embodiment, the tool is ratcheted forward and released backward through the free arc manually or by way of a motor attachment. The cleaning elements chosen at a given time obviously depend on the particular stage of cleaning involved. In any case, a large proportion of the fragments dislodged by the cleaning elements move into the proximate debris ports and/or progress to the outside of the tool, thus allowing tool use to continue for a substantial time.

Accordingly, it is a principal object of the invention to provide a tool for efficiently and systematically cleaning the facing surfaces of flanges in piping systems.

It is another object of the invention to provide a flange-cleaning tool incorporating a ratchet mechanism.

It is a further object of the invention to provide a flange-cleaning tool that can be used comfortably in cramped conditions.

It is yet another object of the invention to provide a flange-cleaning tool that includes a central actuating disk with handle and two attached cleaning disks.

It is an object of the invention to provide a flange-cleaning tool with a wide range of detachably attachable cleaning elements.

Still another object of the invention is to provide a flange-cleaning tool with auxiliary devices for extra leverage.

Another object of the invention is to provide a flange-cleaning tool that can be powered either manually or by motor.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1A is an exploded perspective view of a flange-cleaning tool according to the present invention.

FIG. 1B is a detail view of the cleaning element of the present invention.

FIG. 1C is a detail view of another embodiment of the cleaning element.

FIG. 4 is a partial environmental view of the present invention.

FIG. 5 is a detail view of an embodiment of the handle area of the present invention.

FIG. 6 is a detail view of another embodiment of the handle area.

Similar reference characters denote corresponding features consistently throughout the attached drawings.

DETAILED DESCRIPTION OF THE PREFERRED EMBODIMENTS

Referring now to FIG. 1A, the present invention is a flange-cleaning tool, generally designated 10, which is particularly adapted for use in cleaning piping system flange pairs on location. Waste needing to be cleaned from flange pairs 11, 13, shown in FIG. 2, typically includes old gaskets, often delaminated, adhesives, and the like. In such situations, the surroundings are often cramped, which adds to the awkwardness of the use of traditional flange-cleaning methods. Generally, these methods involve driving wedges between flanges 11, 13 to spread their facing surfaces 15, 17 enough to allow the insertion of scraping devices, or employing a spreading tool, as is well known in the industry. The scraping devices may include hacksaw blades or similar thin blades, which are wielded manually. Thinness of the tool is frequently critical, since piping systems may have little play, and frequently resist significant spreading of flanges. Thus, even a spreading tool designed for this situation may prove ineffective.

Even when this process of scraping is carried out carefully it is not unusual, due to the cramped working conditions and inherently unsystematic nature of the process, for some material to be missed. Such leftover material can interfere with the seal of any new gasket installed. The resulting joint leak may necessitate closing down part or all of the involved piping system for a rework. In contrast, the instant flange-cleaning tool handles the task of cleaning facing flange surfaces in a systematic and efficient manner.

Figure 3:
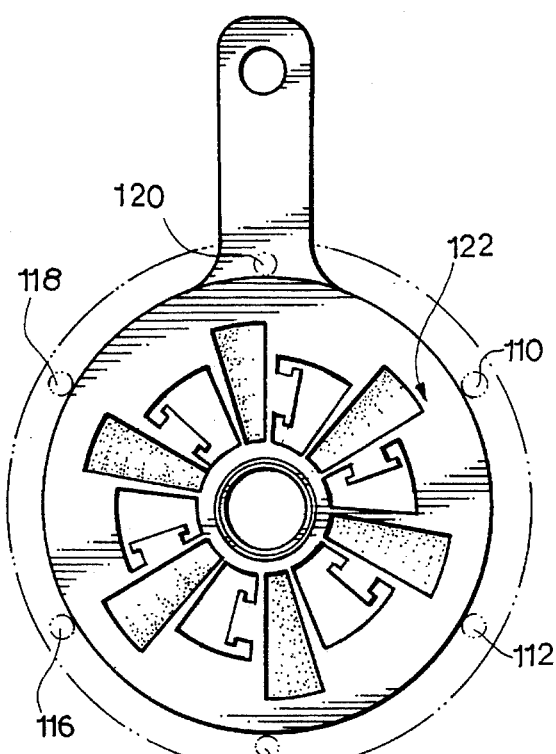
FIG. 3 is an environmental front view of the cleaning piece of the present invention.
Figure 2:
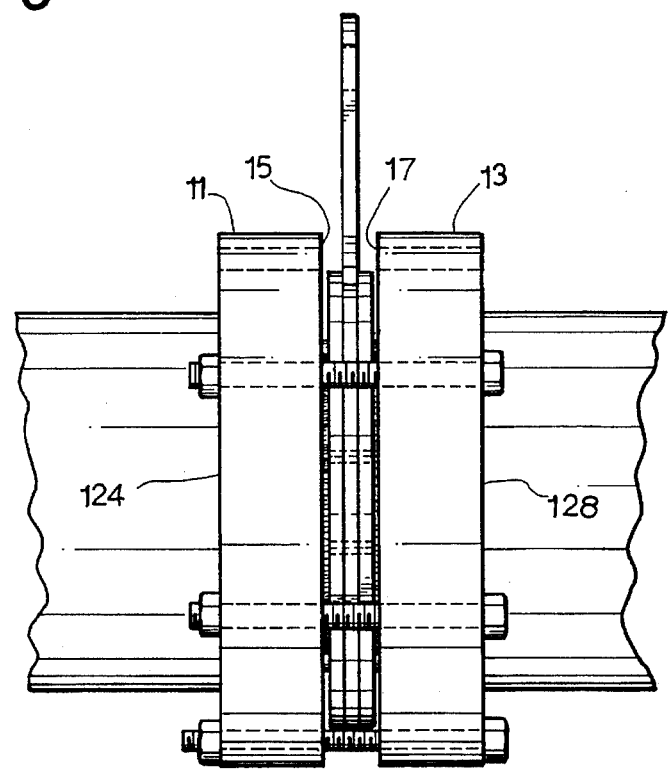
FIG. 2 is an environmental side view of the present invention.

FIG. 1A shows the primary embodiment of the tool in exploded form, while FIG. 2 shows it in assembled form and in use. An actuating element 12 includes a handle 14 and a main component 16, with the main component 16 having a first inner perimeter 18 surrounding a circular aperture 20. The main component 16 is shown in all figures as an actuating disk 22, but it is obvious that it could take on other shapes. The actuating disk 22 and handle 14 are integral and coplanar. Coplanar is used here to mean that the handle 14 and actuating disk 22 are of similar thickness and lie in the same plane, forming an essentially flat surface. In order to allow for insertion within a very small gap between flanges, as is shown in FIG. 2, the actuating disk 22 can be made very thin. It is envisioned that the total thickness of the flange-cleaning tool 10 may be as little as ⅜th of an inch, with the thickness of the actuating disk 22 being in the neighborhood of ⅛th of an inch. Of course, other dimension values are possible. The preferred material is a high-quality spring steel, or equivalent, that provides maximum rigidity and allows stringent thinness.

In use, the flange-cleaning tool 10 is moved by the handle 14 of the actuating element 12, with the actuating element 12 thus imparting an input motion to the tool 10. In the embodiments shown in the figures, the tool 10 further includes two cleaning pieces 24, 26, which are also very thin and which include second inner perimeters 28, 30. The cleaning pieces 24, 26 are attached laterally to the actuating element 12, sandwiching the main component 16. The cleaning pieces 24, 26 are preferably configured as cleaning disks 24, 26, of the same diameter as the actuating disk 22. As with the main component 16, other shapes are possible. It is also possible, for instance when greater thinness is desired, to use only one cleaning piece 24. However, the presence in the primary embodiment of the described two simultaneously usable opposed cleaning surfaces, of the cleaning disks 24, 26, speeds cleaning in situations that allow the entrance of a flange-cleaning tool 10 with the greater thickness.

These cleaning disks 24, 26 are one form of rotating cleaning means. It is also possible, though not shown, to have rotating cleaning means integral to the actuating element 12.

Securement of the cleaning disks 24, 26 to the actuating element 12 is effected with retaining means 32. Shown in FIG. 1 are a hub 34 and a bushing 36. The hub 34 and bushing 36 are dimensioned and configured to fit tightly within the first inner perimeter 18 and the second inner perimeters 28, 30. The hub 34 has two ends, a first end 38 and a second end 40. Connected to each of the ends 38, 40 is a retaining lip 42. Only one restraining lip 42 is shown in FIG. 1A, in order to suggest a possible pre-assembly configuration. The retaining lip 42, which may be permanent or temporary, may be configured in a variety of ways. It may be manufactured as an integral part of the hub 34, or it may be welded on after insertion into the tool 10. Alternatively, retaining lip 42 may be formed by rolling or pressing of the hub 42 after insertion.

The bushing 36, made of soft metal or another low-friction material, rests between the hub 34 and the first and second inner perimeters 18, 28, 30. It may be cylindrical, of a washer-type shape, or of any other useful configuration.

The union of the actuating element 12 and the cleaning disks 24, 26 is effected in order to make possible the use of a ratchet mechanism 44. The actuating element 12 includes a driving ratchet mechanism 46, which is configured to fit complementarily with a driven ratchet mechanism 48 included in each of the cleaning disks 24, 26. The ratchet mechanism 44 is of any of the types well-known in the art. For instance, in the primary embodiment three controlling ratcheting teeth 50, 52, 54 are provided along the a first outer perimeter 56 of the actuating disk 22, while a second outer perimeter 58 of each of the cleaning disks 24, 26 is configured to provide a plurality of receiving ratcheting teeth 60. The three controlling ratcheting teeth 50, 52, 54 are fixed at equal arc distances to provide even torque to the cleaning disks 24 26 and to provide three even support points for the lateral force applied to the flange surface. Thus, the tool 10 is protected from the threat of warping or bowing under stain. Alternatively, ratchet teeth may be located radially, proximate to the first and second inner perimeters 18, 28, 30.

It is also possible to dispense with the ratchet mechanism 44. For instance, the embodiment described above in which the rotating cleaning means is integral to the actuating element, dispensing of the cleaning disks, could operate without a ratchet mechanism 44.

Actual cleaning of flange surfaces 15, 17 is accomplished by a plurality of cleaning elements 62, which in the primary embodiments are included in the cleaning pieces 24, 26. In alternative embodiments in which the rotating cleaning means are integral to the actuating element 12, the cleaning elements 62 are clearly part of the actuating element 12. By cleaning elements 62 it is meant any of a variety of tools useful to the cleaning of waste. Cleaning elements 62 have surfaces suitable for cleaning a flange. For example, radially oriented, axially projecting cutting blades may be formed in or attached to a disk 24 or 26, for removing large pieces of gasket. Disk 24 or 26 may have a rigid or resilient wiping blade for removing minor leakage residue or dust from a previous cleaning operation. In a further example, disk 24 or 26 may include an abrasive lining, as by coating with abrasive grit, for resurfacing the metal face of the flange. Known tools which may be adapted for use in the present invention, therefore, may include razor, rasp, file, and sandpaper blades, among others.

The cleaning elements 62 may be permanently or detachably attached to the tool 10. Axial surfaces of tool 10 rubbing against flanges are preferably treated to impart low friction characteristics thereto. These surfaces may be highly polished, or coated with a substance such as polytetrafluoroethylene. This treatement will help compensate for friction generated by the cleaning surface with the flange.

FIG. 1A shows a primary arrangement for detachably attached cleaning elements 62, with only two cleaning elements 64, 66 displayed. Cleaning element 64 or 66 includes a body 68 and an implement 70. In this embodiment, implement 70, an indeterminate blade, is a permanent part of cleaning element 64. In other embodiments, such as that shown in the detail view of FIG. 1B, an implement 72 may be detachably attached to a body 68 by fasteners 74, 76.

Generally, in cases of detachably attachable cleaning elements, each cleaning element 62 is provided with detent-type release devices 78, 80. The release devices 78, 80 are complementary with a tooth 82 integral to an element site 84 of the cleaning disk 24. Thus, a cleaning element 62 can be replaced at will by snapping out one in use and replacing it with a different one. In another embodiment, shown at one element site 84 in FIG. 4, an entire cleaning element 62 is secured to the cleaning disk by screws or similar fasteners.

As shown, the body 68 projects through the element site 84 with a reinforcing tab 90. When the tool 10 is assembled and in use, the reinforcing tab 90 bears against the actuating disk 22 and provides reinforcement for the cleaning element 62.

Next to each element site 84 is a debris aperture 92. In use, some of the waste or debris from the facing flange surfaces 15, 17 being cleaned will be pushed into the debris aperture 92, thus lengthening the amount of cleaning a user can do without having to clean off the flange-cleaning tool 10. Some debris will also exit from the sides of the flange-cleaning tool 10.

The tool 10 may include an additional leverage device 94. For instance, shown in FIG. 4 is a bar 96, attachable to the handle 14 by a typical fastener arrangement 98 that secures through a circular aperture 100. Shown in FIG. 5 is a T-housing 102, which also attaches to the handle 14. Other configurations of leverage devices are possible.

Another embodiment of the tool 10, shown in FIG. 6, provides the handle 14 with a reinforcing lip 104. The reinforcing lip 104 is particularly useful if a difficult cleaning situation makes it desirable to hammer upon the handle 14 to help it move.

In use, the tool 10 may be powered manually or by mechanical driving means. Versions of both options are shown in FIG. 4. A motor 106 turns a crank arrangement 108, which in turn moves the handle 14 of the tool 10 back and forth.

The methods of use of the flange-cleaning tool 10 have been implied in the figures and above discussion. A general summary of use may begin with securing a pair of flanges 11, 13 to a distance sufficient to allow the insertion of the tool 10. If, as is common, the flanges 11, 13 are held together by bolts, then, for instance, it may be necessary to remove the bolts entirely from bolt holes 110, 112, 120, while loosening the bolts in holes 114, 116, and 118 to allow a minimum gap, slightly greater than the thickness of the tool 10, to form.

The flange-cleaning tool 10, which must have a radius 120 smaller than the radial distance 122 from the center 124 of a flange 11 to a bolt hole 110 ( or 112, 114, 116, 118, or 120), is inserted between the pair of flanges 11, 13. The centerpoint 126 of the tool 10 is lined up with the centerpoints 124, 128 of the flanges 11, 13.

The bolts in bolt holes 114,116, and 118 may be tightened, if desired, to bring the cleaning elements 62 on both cleaning disks 24, 26 into contact with the inner flange surfaces 15, 17. Bolts may also be inserted back into bolt holes 110, 112, 120 and similarly tightened, or some or all of bolt holes 110, 112 and 120 may be left empty. The user is advised to balance the advantages of an even distribution of support points against the value of a streamlined tightening process and freedom of movement of the tool 10. Once the tightening process has been finished, the tool 10 is ready for use.

In use, the tool 10 is moved so that the implements 70 of the cleaning disks 24, 26 contact and clean, as by scraping, wiping, or abrading, the inner flange surfaces 15, 17. Movement is generally by partial rotation, or oscillation, when, for instance, the flanges 11, 13 are secured by bolts in some or all of bolt holes 110, 112, 114, 116, 118, 120. As implied above, it is likely that the user will wish to leave some bolt holes empty in order to allow a wide arc of movement for the tool 10.

In situations where the flanges are tightened together by means that do not include through-extending fasteners such as bolts, it may be possible to fully rotate the flange-cleaning tool 10.

It is to be understood that the present invention is not limited to the embodiments described above, but encompasses any and all embodiments within the scope of the following claims.

I claim:

1. A flange-cleaning tool, insertable between two abutting flanges when the flanges are separated, comprising:

an actuating element including a main component and a handle, said main component and said handle being integral and coplanar, said main component having a first inner perimeter and a first outer perimeter;

rotating cleaning means including at least one cleaning piece, each of said at least one cleaning piece having a plurality of cleaning elements, a second inner perimeter and a second outer perimeter, said actuating element imparting an input motion to said rotating cleaning means; and retaining means including a hub configured to fit within said first inner parameter and said second inner parameter, said retaining means having a first end and a second end, said retaining means retaining said at least one cleaning piece in contact with said actuating element.

2. The flange-cleaning tool according to claim 1, wherein said input motion is oscillating.

3. The flange-cleaning tool according to claim 1, wherein said actuating element includes a driving ratchet mechanism, and wherein said rotating cleaning means includes a driven ratchet mechanism configured to fit complementarily with said driving ratchet mechanism.

4. The flange-cleaning tool according to claim 1, wherein said main component is an actuating disk and said at least one cleaning piece is at least one cleaning disk.

5. The flange-cleaning tool according to claim 4, wherein said actuating element includes a driving ratchet mechanism; and wherein said rotating cleaning means includes a driven ratchet mechanism configured to fit complementarily with said driving ratchet mechanism;

said driving ratchet mechanism comprising at least one controlling ratchet tooth and said driven ratchet mechanism comprising at least one plurality of receiving ratchet teeth, with said first outer perimeter of said actuating disk being configured to include said at least one controlling ratcheting tooth and each of said second outer perimeters of each of said at least one cleaning disks being configured to include one of said at least one plurality of receiving ratcheting teeth.

6. The flange-cleaning tool according to claim 1, said handle further including a leverage device.

7. The flange-cleaning tool according to claim 1, said rotating cleaning means further including a plurality of means defining debris apertures.

8. The flange-cleaning tool according to claim 1, each of said first end and said second end having a retaining lip.

9. The flange-cleaning tool according to claims 8, further including a bushing configured to fit between said retaining means and said first and second inner perimeters.

10. The flange-cleaning tool according to claim 1, said plurality of cleaning elements being a permanent part of said at least one cleaning piece.

11. The flange-cleaning tool according to claim 1, said plurality of cleaning elements configured to be detachably attachable to said at least one cleaning piece.

12. The flange-cleaning tool according to claim 1, further including mechanical driving means.

13. The flange-cleaning tool according to claim 1, said handle further including a reinforcing lip.

14. A flange-cleaning tool, insertable between two abutting flanges when the flanges are separated, comprising:

an actuating element, rotating cleaning means, said actuating element imparting an input motion to said rotating cleaning means, and simultaneously usable opposed cleaning surfaces integral to said rotating cleaning means.

* * * * *